United States Patent [19]
Freeman

[11] 3,879,080
[45] Apr. 22, 1975

[54] HATCHBACK AUTOMOBILE ACCESSORY

[76] Inventor: Del Page Freeman, 738 S. Atlantic Ave., No. 806, Cocoa Beach, Fla. 32931

[22] Filed: June 7, 1973

[21] Appl. No.: 367,796

[52] U.S. Cl. .................................. 296/24 R
[51] Int. Cl. .................................. B62d 33/04
[58] Field of Search .......... 296/26, 24 C, 24 R, 76, 296/99

[56] References Cited
UNITED STATES PATENTS
2,074,620  3/1937  Sa Couto ........................ 296/99
3,107,649  10/1963  Blend, Jr. ...................... 296/24 C Primary Examiner—Stanley H. Tollberg
Assistant Examiner—Norman L. Stack, Jr.
Attorney, Agent, or Firm—Duckworth, Hobby & Allen

[57] ABSTRACT

An accessory for hatchback automobiles comprises a water tight member adapted so as to be supported by the automobile in the hatchback opening, the member supporting the hatchback cover in a position away from the opening. The water tight member has a rearward window therein such that rearward observation by an operator of the automobile is unobstructed.

4 Claims, 3 Drawing Figures

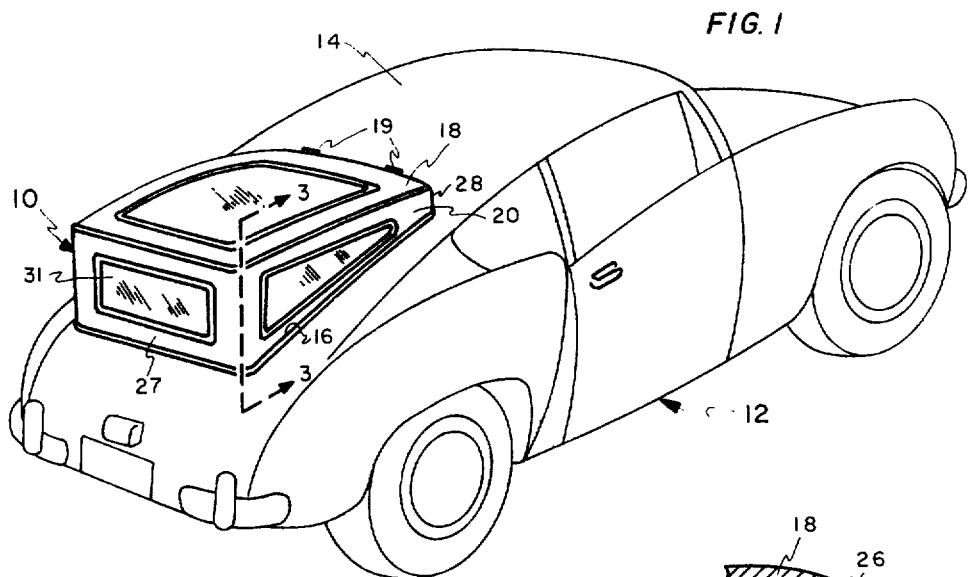
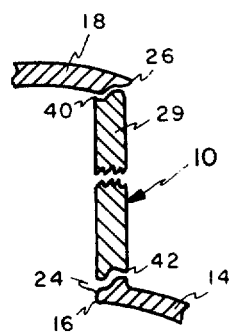
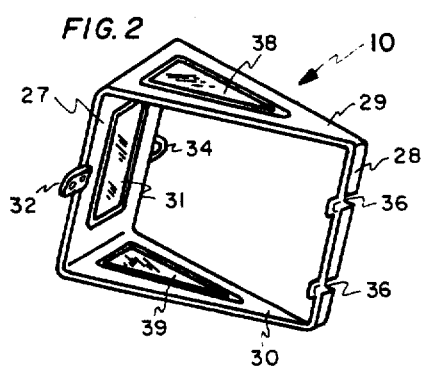
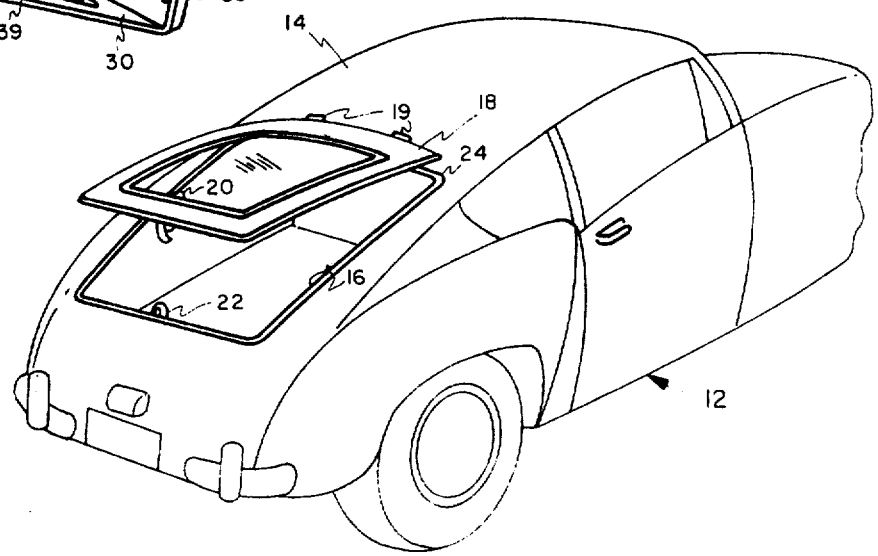

HATCHBACK AUTOMOBILE ACCESSORY

BACKGROUND OF THE INVENTION

1. Field of the Invention

The present invention relates to automobile accessories, and in particular relates to trunk inserts for hatchback automobiles.

2. Description of the Prior Art

So called "hatchback" automobiles generally have a rearwardly sloping roof and a hinged hatchback cover in the sloped car portion of the roof. This hatchback cover is somewhat akin to the rear door of station wagons, in that the cover provides access to the rear portion of the passenger compartment as opposed to a standard passenger automobile, where the passenger compartment is separated from the trunk area.

There are suggestions in the prior art for extending useful trunk space in a standard passenger automobile. For example, in U.S. Pat. No. 3,423,125, to Saito, discloses a folding cage-like trunk attachment useful for transporting animals in a car trunk. Teague, in U.S. Pat. No. 3,271,066 teaches an articulated deck cover also for expanding trunk space. Examples of other arrangements are also disclosed in U.S. Pat. Nos. 3,198,571 to Majeski; 3,306,656 to Hughes; and 3,233,936 to Jakosky. This list is not complete.

While some of the above arrangements are adaptable for use with hatchback automobiles, most require relatively complicated expansion apparatus, or alternatively do not provide a water tight arrangement which may be locked when the vehicle is unattended.

SUMMARY OF THE INVENTION

The present invention contemplates an accessory for hatchback automobiles of the type having a sloping rear roof and an opening therein with a hinged hatchback cover in said opening, the accessory comprising a water tight member adapted to be supported by the automobile in the opening with the water tight member adapted to support the hatchback cover in a position away from the opening. The water tight member has a rearward window therein, such that rearward observation by an operator of the automobile is unobstructed.

In a specific embodiment, the automobile includes latching means on the cover and latch engaging means about the periphery of the opening, with the accessory member having corresponding latching means and latch engaging means such that the automobile latching means engages the accessory member latch engaging means and the accessory member latch likewise engages the automobile engaging means, to lock the accessory member into position.

THE DRAWING

FIG. 1 is a perspective view of a hatchback automobile employing the accessory of the present invention.

FIG. 2 is a perspective view like that of FIG. 1 with the accessory of the present invention rotated away from the hatchback automobile.

FIG. 3 is a cross section of a portion of FIG. 1, taken along the line 3–3'.

DETAILED DESCRIPTION

An embodiment of the present invention will be described with reference to FIG. 1.

The accessory of the present invention comprises a water tight member, referred to generally as 10, which is adapted for use with a hatchback automobile 12. A wide variety of hatchback vehicles are presently commercially available, including foreign makes, such as the MGB, GT, the DATSUN 240, and TRIUMPH "GRAND TURISMO" (GT6) as well as domestic makes such as the NOVA, the OMEGA, the PINTO and others. While the vehicle 12 of FIG. 1 is illustrated as a TRIUMPH GT6, it will be understood that the dimensions of the member 10 may be designed to accommodate a wide variety of automobile makes without departing from the spirit and scope of the present invention.

The automobile 12 includes a downwardly sloped roof rear 14 having an opening 16 therein with a hatchback cover 18 hingedly mounted to the rear roof 14 of the automobile 12 in a well known manner by hinges 19. Noting FIG. 2, the automobile 12 further comprises a latch 20 on the outer periphery of the cover 18 and the latch engaging means 22 of the periphery of the opening 16 at a point corresponding to the latch 20. A wide variety of automobile latches and engaging means are known in the prior art, and the specific arrangement does not constitute a part of this invention, except that the water tight accessory member 10 also includes corresponding latch engaging means, as is described below in greater detail. The automobile 12 further includes a flange 24 about the periphery of the opening 16, and a corresponding flange 26 around the periphery of the cover 18 such that the cover 18 nests in the opening 16 when the cover is in the closed position.

As shown rotated away from the automobile 12 of FIG. 2, the water tight accessory member 10 in accordance with the present invention, comprises four sides 27, 28, 29 and 30. The four sides comprising solid sheets, such as to prevent water and dirt from entering the automobile 12. Preferably the accessory member 10 is constructed of a unitary piece of molded plastic fiberglass or metal.

The first side 27 is adapted as the rearward side when the accessory member 10 is installed (note FIG. 1), the first side 27 including a rearward window 31 therein such that rearward observation by an operator of the automobile is unobstructed. The first side 27 of the accessory member 10 further includes a latch 32 along the bottom periphery thereof, this accessory member latch 32 corresponding to the automobile latch 20 and positioned at a point next adjacent to the automobile latching means 22 and engagement therewith when the accessory member 10 is installed in the opening 16. In a like manner, the first side 27 of the accessory member 10 further includes a latch engaging means 34 corresponding to the automobile latch engaging means 22, and located on the upper periphery of the accessory member adjacent the automobile latch 20 when the member is installed, such that the automobile latch 20 engages the access member engaging means 34.

The second side 28 of the accessory member 10 opposes the first side 27 and includes indentations 36 therein which correspond to and are adapted to fit about the hinges 19 when the access member 10 is installed.

The third and fourth sides 29, 30 of the access member 10 are generally triangular in shape in a rearward direction from the second side 28 to the first side 27, such that the hatchback cover 18 is held in an approximately horizontal position when the accessory member 10 is installed. Preferably, the third and fourth sides include side windows 38, 39 respectively therein.

Noting FIG. 3, the accessory member 10 further includes an upper peripheral flange 40 corresponding to the flange 24 about the opening 16 in the roof rear 14 of the automobile 12, and a lower peripheral flange 42 corresponding to the flange 26 about the cover 18, such that the cover tightly nests with the accessory member 10 and the member 10 tightly nests in the opening 16 so as to achieve a complete water tight seal between the cover 18 and the accessory member 10, and between that member and the periphery of the opening 16.

As will be appreciated by those skilled in the art, the flange-and-latch combination employed with the access member 10 allows the member to be locked into place while maintaining a water tight seal. Further, the latch arrangement of the member 10 allows the member to be rigidly and securely fastened in position, the indentations 36 in the second side 28 further preventing sideward movement of member 10 while installed. The accessory member 10 increases the available capacity of the hatchback automobile 12.

I claim:

1. An accessory for hatchback automobiles of the type having a sloping roof and an opening therein with a hinged hatchback cover in said opening, wherein said cover includes latching means on the periphery thereof, said sutomobile further including means at a corresponding point on the periphery of said opening for engaging said latching means, comprising:
    a water tight member adapted to be supported by said automobile in said opening, said water tight member adapted to secure said hatchback cover in a raised position away from said opening to expand the continuous volume of the interior of said automobile, said water tight member bridging the area between said opening and said cover;
    said water tight member having a rearward window therein providing rearward, unobstructed observation by an operator of said automobile;
    latching means corresponding to said automobile latching means and located adjacent a point on the periphery of said water tight member next adjacent to said automobile engaging means when said member is installed in said opening;
    latch engaging means corresponding to said automobile engaging means and located adjacent a point on the periphery of said water tight member next adjacent to said automobile latching means when said member is installed in said opening;
    said accessory latching means is latched to said automobile engaging means, and said automobile latching means is engaged to said accessory engaging means when said accessory is installed in said opening; and wherein
    the periphery of said cover and the periphery of said opening each include a flange nestable one with the other, said member further comprising two peripheral flanges, one flange adjacent to and opposing said opening and nestable therewith, and the other flange adjacent to and opposing said cover and nestable therewith.

2. An accessory as recited in claim 1, wherein said automobile includes hinges joining said cover thereto, said member of said accessory further comprising indentations along the side thereof corresponding to and opposing said hinges.

3. An accessory as recited in claim 2 wherein said member comprises:
    four sides;
    a first one of said sides having said latching and engaging means thereon;
    a second one of said sides opposing said side and including said indentations thereon;
    third and fourth ones of said sides being substantially normal to said first and second sides, said third and fourth sides having a triangular shape of increasing dimension away from said second side in a direction toward said first side, and including windows therein.

4. An accessory as recited in claim 3 wherein said member comprises an integral molded unit.

* * * * *